J. B. ENTZ.
TRANSMISSION AND CONTROL FOR MOTOR VEHICLES.
APPLICATION FILED JUNE 22, 1914.
1,276,045.
Patented Aug. 20, 1918.
Fig. 1.
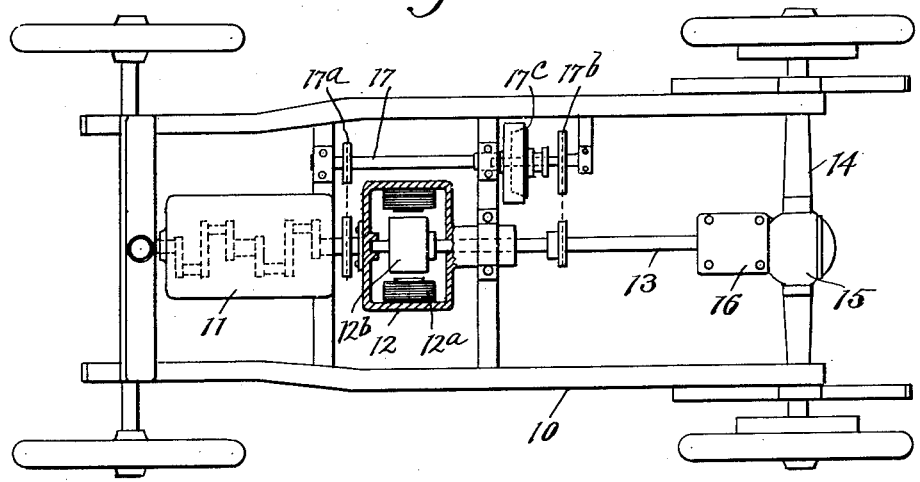
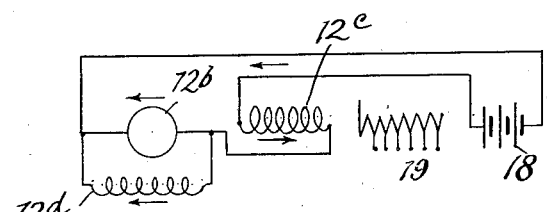
Fig. 2.
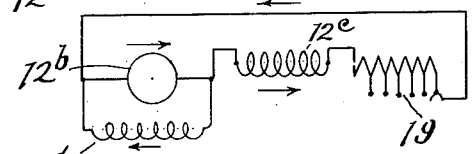
Fig. 3.
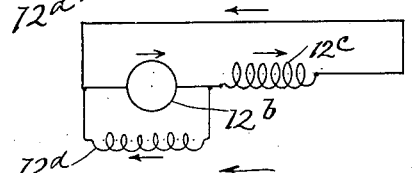
Fig. 4.
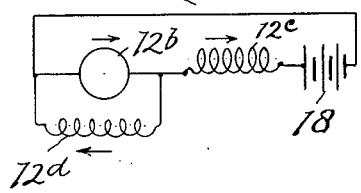
Fig. 5.
Witnesses.
E. B. Gilchrist
L. J. Porter
Inventor.
Justus B. Entz
by Thurston & Kwis
Attys.

UNITED STATES PATENT OFFICE.

JUSTUS B. ENTZ, OF CLEVELAND, OHIO.

TRANSMISSION AND CONTROL FOR MOTOR-VEHICLES.

1,276,045.  Specification of Letters Patent.  Patented Aug. 20, 1918.

Application filed June 22, 1914. Serial No. 846,473.

*To all whom it may concern:*

Be it known that I, JUSTUS B. ENTZ, a citizen of the United States, residing at Cleveland, in the county of Cuyahoga and State of Ohio, have invented a certain new and useful Improvement in Transmissions and Controls for Motor-Vehicles, of which the following is a full, clear, and exact description.

This invention relates to power transmitting means especially for motor vehicles, and it relates particularly to variable speed transmission mechanisms of the type employing a dynamo electric as a variable speed transmitting element between the prime mover and driven part.

The chief object of the invention is to provide a transmission of this type adapted for motor vehicles principally and containing but a single dynamo electric machine which functions as a variable speed electric clutch between the engine and propeller shaft, and which may be utilized as a motor to start the engine and serves as a battery charging and lighting generator while the vehicle is in motion.

It is old and well known to provide in place of change speed gearing or gear transmission, one or more electrical units including a dynamo electric machine having rotary field and armature elements, one connected to the engine crank shaft and the other to the propeller shaft, said machine serving primarily as a generator and as an electric clutch between the engine and running gear. It is common also to utilize in connection with this generator or dynamo electric machine a motor which receives current from the generator and propels or assists in propelling the vehicle. A transmission of this type is disclosed in my prior Patent No. 732,062, granted June 30, 1903, and has been used in practice with considerable success. With transmissions of this type the engine is self-starting in the sense that the generator may be used as a motor for starting purposes, and the generator may be used for battery charging purposes, but not when the vehicle is in motion, it being possible to charge the battery only when the vehicle is stationary, the engine and generator then serving solely as a battery charging outfit.

In adapting my invention for motor vehicle use, I utilize a generator such as above mentioned as a variable speed electric clutch for the lower speeds of drive corresponding to what is generally known as low and intermediate speeds, and for high speed I connect the engine to the propeller shaft by mechanical means and drive it at such a speed relative to the speed of the engine that the generator is available for battery charging or lighting purposes as long as the vehicle is run through the medium of the mechanical power transmitting means. To accomplish this, the mechanical power transmitting means causes the propeller shaft and the element of the generator connected to it to be driven faster than the engine, so that, in effect, the direction of rotation of the generator is reversed, and additionally I provide on the field element two field windings which produce opposing fields, one winding producing the predominating field at all speeds, except high, and the second becoming effective for generation or excitation and the first for regulation when the relative rates of speed of the elements of the machine are reversed by throwing in the mechanical transmitting means.

My invention may be briefly summarized as consisting in certain novel combinations and arrangements of parts which shall be described in the specification and set forth in the appended claims.

In the accompanying sheet of drawings, Figure 1 is a plan view of a chassis equipped with my improved transmission, the parts being shown more or less conventionally, and no attempt being made to show the parts in their true proportions. Figs. 2, 3, 4 and 5 are diagrammatic views showing the electrical connections or circuits for starting and for different operating speeds or speed ratios between engine and propeller shaft which may be termed "low," "intermediate" and "high," using the well known terminology applied to gear transmissions.

In the drawings, 10 represents the chassis and 11 an internal combustion engine which may be of any construction. The variable speed transmission between the engine and running gear includes a dynamo electric machine 12, having a rotary field element 12$^a$ connected to the crankshaft of the engine so as to serve as the fly wheel thereof, and a rotary armature 12$^b$ connected to the propeller shaft 13. The propeller shaft will be connected to the live axles of the rear axle construction 14 by the usual differential gears, the casing for which is shown at 15.

Adjoining the differential gears there may be provided any suitable reversing gear inclosed within a casing 16. The details of the reversing gear need not be shown, as the same forms no part of the present invention.

The dynamo electric machine, (which may hereafter be referred to as the dynamo electric machine, although for starting purposes it may be used as a motor) for all speeds of drive except high serves as an electric clutch, the engine driving the field element, which in turn rotates the armature at a less speed. The relative rates of speed of the field and armature elements or the slippage may be varied by changing the resistance of the dynamo electric machine circuit, so as to vary the speed of drive, as will be explained.

Additionally, I have provided means for connecting the engine to the propeller shaft independently of the electric clutch or dynamo electric machine and in such a manner that the armature of the latter will be driven at a higher rate of speed than the field magnet.

To accomplish this various expedients may be utilized, the construction shown being merely one of numerous ways in which the desired result may be obtained. This mechanism includes a countershaft 17, together with chain and sprocket gearing 17$^a$ and 17$^b$, which respectively connect the crank shaft of the engine to the countershaft, and the countershaft to the propeller shaft, together with the clutch 17$^c$ of any suitable type by which this gearing may be thrown into action, the sizes of the sprockets of the two sets or trains of gearing being such that when the clutch is thrown in the propeller shaft and armature will be driven at a speed considerably higher than is possible with the electric clutch as the power transmitting medium, and the difference in speed between the armature and field magnet being such that the generated voltage of the dynamo electric machine will be sufficiently high for battery charging and lighting purposes.

The field magnet of the dynamo electric machine is provided with two field windings, i. e. a series winding 12$^c$ and a shunt winding 12$^d$. The series winding corresponds to the winding usually provided for excitation purposes in the dynamo electric machine or electric clutch of an electric transmission, and this winding is the effective exciting winding for starting and for low and intermediate speeds of drive, but with this winding alone the machine would not generate at high speed or when the mechanical transmitting means is thrown into action. I therefore provide the shunt field winding, which produces a field opposing the field produced by the series winding, and which produces the predominating field only at high speed or with the mechanical power transmitting means in action.

In Fig. 2 I have shown the electrical connections for starting position of the controller (not shown). The battery 18 now supplies current to the machine 12, which functions as a motor and starts the engine, the direction of current being indicated by the arrows.

In Fig. 3 I have shown the connections for low speed drive. In this instance the battery 18 is cut out of circuit, the connections of the series winding are reversed, and resistance 19 is cut into the generator circuit. The dynamo electric machine now functions as a generator, but in view of the resistance in the generator circuit, and due in part also to the opposing action of the shunt field winding, there is considerable slippage between the armature and field magnet, the armature being rotated by the rotating field magnet, but at a much less speed than the latter.

In Fig. 4 I have shown the connections for what I previously termed the "intermediate speed." The direction of the current is the same as in Fig. 3, but the resistance 19 is all cut out of circuit, so that the generator still serves as an electric clutch, but the slippage between the armature and the field magnet is now considerably less than when resistance 19 is in circuit, and in fact with the resistance all cut out of circuit the armature is rotated at nearly the speed of the field magnet. It will be understood that the resistance may be gradually cut out of circuit so as to gradually increase the speed of the armature relative to the field magnet, and hence to gradually increase the speed of drive.

For starting and for low and intermediate speeds of drive, the series winding is the exciting winding, and the shunt winding has an opposing action, but the opposing action is not great because of the low voltage drop across the terminals of the armature. The opposing action is least when the resistance is cut out of circuit, as in Fig. 4, and in fact at such time it is almost negligible.

In Fig. 5 I have shown the connections and the direction of current for battery charging position of the controller during high speed drive when the mechanical means and not the electrical transmits power between the engine and the propeller shaft. The shunt field winding now is available for excitation purposes, and produces a field which is stronger than that produced by the series winding, due to the increased voltage across the terminals of the armature. The series winding now produces a field which opposes that produced by the shunt winding, and serves as a regulating winding, so that the battery is charged at a substantially constant rate regardless of variations in engine speed effected by adjusting the throttle valve or the spark.

The generator which is here shown as connected to the battery will charge the same or will furnish current to lamps (not shown) as long as the machine is driven on what may be termed "high gear" or through the medium of the mechanical power transmitting means.

While I have shown the preferred use of the invention, i, e. on motor vehicles, it may be used for other purposes and under conditions which may or may not require all the features or functions in its preferred use in the automobile field.

Having described my invention what I claim is:—

1. In combination with a prime mover, a driven part, variable speed power transmitting means between the prime mover and driven part, comprising an electric clutch in the form of a dynamo electric machine having rotary field and armature elements, one connected to the prime mover and the other connected to said driven part and adapted to be rotated by the first mentioned element, and additional gearing means connected directly with the shaft of the prime mover and with the driven part.

2. In combination with a prime mover and driven part, of an electric clutch between the same, comprising a dynamo electric machine having rotary field and armature elements, one connected to the prime mover and the other to the driven part, a counter-shaft, gearing connecting the counter-shaft with the shaft of the prime mover, gearing connecting the counter-shaft with the driven part, and a clutch for making the connection through the counter-shaft effective.

3. In combination with a prime mover and driven shaft, a power transmitting means between the same, comprising an electric clutch, consisting of a dynamo electric machine having rotary field and armature elements, one connected to the prime mover and the other connected to the driven shaft and adapted to be rotated by the first, and mechanical means whereby said shaft may be driven by the prime mover at a speed higher than that of the prime mover.

4. In combination with a prime mover and driven shaft, power transmitting means between the same, comprising a clutch consisting of a dynamo electric machine having rotary field and armature elements, one connected to the engine and the second to the said driven shaft, means whereby the first element may cause the second element to be rotated at different speeds relative to the first, and means for driving said shaft and the element of the dynamo electric machine connected to it at a speed higher than the speed of the element of the dynamo electric machine connected to the prime mover.

5. In combination with a driven part, an internal combustion engine, variable speed power transmitting means between the engine and driven part, comprising a dynamo electric machine having rotary field and armature elements, one connected to the engine, and additional means for transmitting power to the driven part and for driving the second element of the dynamo electric machine faster than the element connected to the engine is driven.

6. In combination with a driven part, an engine, an electric clutch between the engine and driven part, comprising a dynamo electric machine having rotary field and armature elements, one connected to the engine, and means for transmitting power between the engine and driven part independently of the clutch and for rotating the second element of the dynamo electric machine faster than the element connected to the engine is rotated.

7. In combination with a driven part, a prime mover, a variable speed transmission between the prime mover and the driven part comprising a generator having one element connected to the prime mover and the other element connected to the driven part whereby the second element is rotated at a lesser speed than the first element, and means whereby the driven part may be driven by the prime mover independently of the generator with the second element rotating at a higher speed than the first.

8. In combination with a driven part, an internal combustion engine, variable speed power transmitting means between the engine and driven part, comprising a dynamo electric machine having rotary field and armature elements, one of said elements being connected to the engine so as to be rotated thereby, whereby the second may be rotated by the first at a less speed than the latter, and means whereby said second element as well as the first may be driven by the engine with the second element rotating faster than the first.

9. In combination with a driven part, an internal combustion engine, a variable speed power transmitting means between the engine and driven part, comprising a dynamo electric machine having rotary field and armature elements, one connected to the engine so as to be rotated thereby, whereby the second may be rotated by the first, means for varying the slippage or the rate of speed of the second element relative to the first, and means for transmitting power between the engine and the running gear and for rotating the second element faster than the first.

10. In combination with a driven part, an internal combustion engine, an electric clutch between the engine and the driven part, comprising a dynamo electric machine having rotary field and armature elements, one connected to the engine, means whereby rotation of said element causes the second to be rotated at different rates of speed relative to the first, means for causing the second element to be rotated faster than the first, said dynamo electric machine having two field windings, one being principally effective for excitation when the first element rotates faster than the second, and the other winding being principally effective for excitation when the second element rotates faster than the first.

11. In combination with a driven part, an internal combustion engine, variable speed power transmitting means between the engine and the running gear, comprising a dynamo electric machine having rotary field and armature elements, one connected to the engine and the other to the driven part, whereby the rotation of the first element rotates the second element, and whereby the difference in the relative rates of speed may be varied, means for rotating the second element faster than the first, said dynamo electric machine having series and shunt windings, wound so as to produce opposing fields, the series winding being effective for excitation when the second element is rotated at a less speed than the first, and the shunt winding being effective for excitation when the second element is rotated at a higher speed than the first.

12. In combination with a driven part, an internal combustion engine, a storage battery, a variable speed power transmitting means between the engine and driven part, comprising a dynamo electric machine having rotary field and armature elements, one connected to the engine, said dynamo electric machine having two oppositely wound field windings, electrical means whereby the rotation of the element connected to the engine may cause the other or second element to be rotated at different speeds relative to the first, and means for rotating said second element at a speed sufficiently greater than the speed of the first that the generated voltage is in excess of that of the battery.

13. In combination, a prime mover a driven part, a dynamo electric machine having rotary field and armature elements, means connecting one of said elements to the prime mover, means connecting the other of said elements to the driven part, independent means connecting the prime mover with the driven part, whereby the driven part is actuated and the element of the dynamo electric machine connected with the driven part is also actuated to rotate at a speed which is different than the speed of rotation of the dynamo electric machine element connected with the prime mover.

In testimony whereof, I hereunto affix my signature in the presence of two witnesses.

JUSTUS B. ENTZ.

Witnesses:
  A. F. KWIS,
  L. I. PORTER.